United States Patent
Tratzky et al.

(10) Patent No.: US 6,902,761 B2
(45) Date of Patent: Jun. 7, 2005

(54) SELECTIVE COATING OF THE INTERIOR OF GLASS TUBES WITH A METALLIC MIRROR SURFACE

(75) Inventors: Stephan Tratzky, Neustadt (DE); Heinz Dotzler, Tirschenreuth (DE); Matthias Müller, Mitterteich (DE); Joachim Pfeifer, Bayreuth (DE); Michael Siller, Leonberg (DE); Leonid Schulz, Mitterteich (DE); Gottfried Haas, Tirschenreuth (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 10/266,178

(22) Filed: Oct. 7, 2002

(65) Prior Publication Data

US 2003/0113448 A1  Jun. 19, 2003

(30) Foreign Application Priority Data

Oct. 10, 2001  (DE) .......................... 101 54 402

(51) Int. Cl.⁷ ................................ B05D 7/22
(52) U.S. Cl. ................ 427/235; 427/231; 427/232; 427/261; 427/264; 427/287; 427/301; 427/304; 427/105; 427/106
(58) Field of Search .............. 427/74, 105, 230, 427/404, 232, 235, 346, 256, 258, 261, 264, 270, 271, 272, 282, 287, 301, 304, 546, 106; 118/DIG. 10, DIG. 13

(56) References Cited

U.S. PATENT DOCUMENTS

| 2,171,086 | A | * | 8/1939 | Bibson ..................... 427/282 |
| 3,723,138 | A | * | 3/1973 | Franz ....................... 427/169 |
| 4,107,254 | A | * | 8/1978 | Webster et al. ............ 264/270 |
| 4,151,312 | A | * | 4/1979 | Compen .................... 427/557 |
| 4,309,959 | A | * | 1/1982 | Yamagishi et al. ......... 118/664 |
| 4,579,107 | A |   | 4/1986 | Deakin ..................... 126/443 |
| 6,187,373 | B1 |  | 2/2001 | Peter ........................ 427/106 |
| 6,238,749 | B1 | * | 5/2001 | Willard et al. ............ 427/510 |

FOREIGN PATENT DOCUMENTS

| DE | 370730 | 5/1921 | | |
| DE | 861 010 | 12/1952 | | |
| DE | 1 421 943 | 4/1969 | | |
| DE | 197 24 362 | 12/1998 | | |
| DE | 198 21 137 | 11/1999 | | |
| DE | 198 21 137 A1 | * 11/1999 | ............ | F24J/2/04 |
| EP | 0 665 304 | 8/1995 | | |
| GB | 2 057 917 | 4/1981 | | |
| GB | 2 213 257 | 8/1989 | | |
| JP | 60-151253 | 8/1985 | | |

* cited by examiner

Primary Examiner—Shrive P. Beck
Assistant Examiner—William Phillip Fletcher, III
(74) Attorney, Agent, or Firm—Baker & Daniels

(57) ABSTRACT

The invention relates to a method for the interior metal-coating of glass tubes, with the metal-coated surface being a cylindrical shell.

In accordance with the invention such a method comprises the following process steps:
- the glass tube is sealed off at either end;
- the glass tube is brought to a horizontal position:
- a sensitizer solution is introduced into the interior space of the glass tube in such a quantity that the interior space is only partly filled;
- the sensitizer solution is removed from the interior space after a certain dwell period;
- a mirror-coating solution is introduced into the interior space of the glass tube, with the entire interior surface of the glass tube being wetted by the mirror-coating solution;
- the used-up mirror-coating solution is removed from the interior space of the glass tube.

19 Claims, No Drawings

SELECTIVE COATING OF THE INTERIOR OF GLASS TUBES WITH A METALLIC MIRROR SURFACE

BACKGROUND OF THE INVENTION

The invention relates to a method for selectively coating glass tubes with a metallic mirror surface.

Metal-coating methods for producing flat mirrors, curved mirrors, paraboloid grooved mirrors, thermos flasks, Christmas tree balls, etc. are generally known. The metal-coating layer is applied there with the reaction solutions by spraying or swivelling the body to be metal-coated. The entire surface area of the respective object is coated.

Depending on the object the requirements may differ, In the case of polished plate glass the structure is important in the sequence of glass, mirror, copper, and lacquer. In the case of thermos flasks the optical aspect is entirely irrelevant.

Special requirements are placed on glass tubes which are metal-coated and are used as vacuum tube collectors. The relevant aspect is to provide the interior surface of the respective glass tube with a reflective layer, namely one half of the interior surface, which occurs in such a way that the reflective surface has the shape of a cylindrical shell. Such cylindrical shell extends over the entire length of the glass tube or a relevant part thereof.

A known method consists of introducing a mirror in the shape of a cylindrical shell into the respective glass tube. This mirror consists of aluminum sheet, for example.

The disadvantages of such a solution are evident. The introduction of the aluminum sheet is a complex process. The workmanship of the completed, inwardly reflective glass tube is unsatisfactory.

SUMMARY OF THE INVENTION

The invention is based on the object of providing a method with which the glass tube can be inwardly metal-coated, with the metal-coated surface only being a cylindrical shell. A precisely defined separation between metal-coated and non-metal-coated regions in the glass tube is to be obtained. The edge of the mirror must be arranged in a sharp and straight manner and must be parallel to the tube axis.

Moreover, the non-metal-coated region (for visual and aesthetic reasons and due to a reduction in the functionality of the ICR tube) must not show any faults such as splashes of silver.

A method in accordance with one form of the invention comprises the following steps:
  the glass tube is sealed off at either end;
  the glass tube is brought to a horizontal position;
  a sensitizer solution is introduced into the interior of the glass tube in such a quantity that the interior of the glass tube is only partly filled;
  the sensitizer solution is removed from the interior of the glass tube after a certain dwell period;
  a mirror-coating solution is introduced into the interior of the glass tube, with the entire interior surface of the glass tube being wetted by the mirror-coating solution; and
  the mirror-coating solution is removed from the interior space of the glass tube.

An alternative method in accordance with the present invention comprises the following steps:
  the interior surface of the glass tube is wetted with a sensitizer solution;
  any excess of sensitizer solution is removed from the interior space of the glass tube;
  the interior surface of the glass tube is wetted with a mirror-coating solution;
  any excess of mirror-coating solution is removed from the interior space of the glass tube;
  the glass tube is brought to the horizontal position;
  the two ends of the glass tube are closed off;
  an etching solution for the partial removal of mirror-coating is introduced into the interior space of the glass tube in such a quantity that the interior space is filled only partly; and
  the etching solution is removed from the interior space of the glass tube after a certain dwell time.

A further method comprises the following steps:
  the interior surface of the glass tube is wetted with a sensitizer solution and, optionally, any excess of sensitizer solution is removed from the interior space of the glass tube;
  a cylindrical shell is introduced into the part of the interior surface of the glass tube which screens off the part of the glass tube which is not to be metal-coated;
  the interior of the glass tube is filled with a mirror-coating solution; and
  any excess of mirror-coating solution is removed from the interior space of the glass tube.

It is possible to apply the principle that the glass tube is brought to the horizontal position during a certain phase of the process and to introduce the respective solution in such a quantity so that the interior space of the glass tube is filled only partly, and accordingly the interior surface of the glass tube is treated only partly by the respective solution.

In this way the glass tube can be metal-coated inwardly in a simple and cost effective way. The method is cost-effective. It leads to a sharp and straight separation of the edge of the mirror. The edge of the mirror extends parallel to the longitudinal axis of the glass tube.

The tube ends can be kept completely free of the mirror. This is advantageous for the reason because during any further hot processing of the tube ends a vaporization of the mirror in the hot shaping zone is prevented.

Optimal reflection properties can be produced with a glass tube which is metal-coated in accordance with the method. The glass tube is free from any visual faults, e.g. salt encrustations or rough mirror surfaces. The thus obtained smoothness of the mirror surface leads to favourable physical results.

The invention leads to a particularly important advantage: The open metal-coated surface, which is the surface which is averted from the glass, is of high quality if in every respect as a result of the invention. It thus completed enclosed and smooth. It thus fulfills its function in an optimal manner. It is also evenly thick when seen over the entire circumference, as also over the entire length.

The reason for this might be that the entire working processes occur in a closed system, namely within the glass tube, and that the processes are better under control than in known methods.

Glass tubes which are metal-coated in such a way can be used in solar collectors as well as for service water heating and for heating support.

DETAILED DESCRIPTION

A preferred embodiment of the method in accordance with the invention for the half-sided coating with silver of the inner wall of a glass tube can be described as follows:

In a possible first step of "preheating" the glass tube is preheated with 80° C. hot air in order to remove water adsorbed on the inner glass surface. This is important for a precise edge formation of the mirror.

In a second step called "sensitizing", 650 ml of sensitizer are filled into a horizontally disposed glass tube. The tube ends are closed off with outwardly sealing plugs. The sensitizer flows through a bore in one of the plugs. A correct flow speed of the sensitizer into the glass tube and the position and formation of the bore in the plug is important, as otherwise faults will occur by disturbing wave movements in the liquid and by splashes on the inner surface of the glass. The sensitizer remains at rest in the interior space of the glass tube for a dwell time between one and sixty seconds or between ten and thirty seconds.

The sensitizer consists of RX concentrate which is diluted 1:50,000 with fully demineralized water. Such dilution process occurs in two steps: The RX concentrate is pre-diluted once per layer in a 10 L container manually 1:1,000 with demineralized water. Said pre-dilution is then again re-diluted to the required dilution ratio for each tube in an automated mixing and dosing unit by a factor of 1:50 with demineralized water.

The dwell time of the sensitizer solution in the interior of the glass tube is between one and sixty seconds, preferably between ten and thirty seconds.

After the filling and after the aforementioned dwell time, the sensitizer is removed from the tube again by opening a discharge in the same plug. This occurs at first in the horizontal position of the tube, then by tiling the tube by approx. 75° in order to speed up the removal. After a waiting period of 20 seconds (this is important in order to allow the sensitizer to drip off to a substantial extent), the, tube is tilted back again to the horizontal position for the next step in the process.

In a second step of "rinsing after sensitizing", 500 ml of demineralized water are filled as in the first step through the same plug into the horizontally disposed glass tube and removed again in the same manner as in the first step in order to thus further reduce residues of the sensitizer in the glass tube.

In a third step, the so-called "metal coating", the glass tube is aligned horizontally and closed off on either side with interior plugs which are able to seal off the glass tube with respect to liquid at a predetermined distance from the tube end. This is important so that the mirror is not formed up to the end of the tube and causes disturbances in further processing.

100 ml of an ammoniac caustic soda solution, 100 ml of a reduction solution and 100 ml of an ammoniac silver nitrate solution are produced, mixed in a predetermined sequence in a special mixing vessel into a mirror-coating solution (the relevant aspect is the optimal height/diameter ratio in the mixing vessel in order to ensure optimal mixing) and then allowed to flow immediately via a hose pipe attached to the discharge of the mixing vessel through one of the plugs into the glass tube.

The inflow rate of the mirror-coating solution should be optimized through the diameter of the hose, the diameter of the bore in the plug and/or the difference in height between mixing vessel and glass tube in order to avoid faults on the mirror (brown rings, splashes).

The mirror-coating solution flows into the tube, then flows in a wave motion through the glass tube to the opposite plug, is reflected there in the direction of the plug through which the mirror-coating solution initially flowed in. Once the wave of the mirror-coating solution flowing into the glass tube has reached the plug again, a rotation process of the glass tube about the tube axis starts (duration: 3 minutes; the precise time of starting the rotation can be important so as to avoid mirror faults). A metallic silver mirror of a thickness of approx. 100:m is produced on the inner surface of the tube by a chemical reaction of the silver salts in the ammoniac silver nitrate solution with the sugar in the reduction solution. The ammoniac caustic soda solution is used for conditioning the pH value of the mirror-coating solution. The dwell time of the mirror-coating solution in the interior of the glass tube can be between one and ten minutes or between two and five minutes.

After a rotation period of three minutes, the now used-up mirror-coating solution is discharged from the glass tube by tilting the tube to one side.

In a fourth step "rinsing after mirror-coating" the glass tube is rinsed with 1.5 L of water in order to wash out any residues of mirror-coating solution from the interior of the tube which might impair the further processing the tube.

In a fifth step the glass tube is dried in a hot air blower with approx. 80° C. over a period of 2.5 minutes.

The interior mirror-coating will generally cover half the inner jacket surface of a glass tube. This means that the mirror surface is a cylindrical half shell. It is obviously also possible to depart from this. The cylindrical shell could therefore also extend over a smaller or larger circumference of the inner jacket surface of the respective glass tube.

"Sensitizer" is understood as being any activation agent with which the glass surface can be pre-activated so that it will accept the mirror-coating solution.

Generally, a mixture of ammoniac nitrate, hydrogen carbonate and a reducing solution is used as a metal-coating solution.

The three methods as listed in the claims can be modified. It is necessary according to claim 1 for example to wet the interior surface of the glass tube with a sensitizer solution. This can be performed in different ways. The interior of the glass tube can be sprayed with sensitizer solution for example. Alternatively, the glass tube can be closed off at either end and can be brought to a horizontal position. Thereafter a sensitizer solution can be introduced into the interior space of the glass tube in such a quantity that the interior space is filled only partly.

The same applies concerning the application of a metal-coating solution and applies to the alternative methods.

The wetting of the interior surface of the glass tube can be produced in different ways, as also the application of the mirror-coating solution. Another method for coating the glass tube in accordance with the invention includes the following steps:

the interior surface of the glass tube is wetted with a sensitizer solution;

optionally, any excess of the sensitizer solution is removed from the interior space of the glass tube;

the interior surface of the tube is wetted with a mirror-coating solution;

optionally, any excess mirror-coating solution is removed from the interior space of the tube;

the glass tube is brought to the horizontal position;

the two ends of the tube are closed off;

an etching solution for the partial removal of mirror-coating solution is introduced into the interior space of the tube in the same manner as the sensitizer solution in the first method in such a quantity that the interior space is filled only partially; and the etching solution is removed from the interior space of the tube after a certain dwell time.

Optionally, any excess of the sensitizer solution or the mirror-coating solution may be removed from the interior space of the glass tube. In accordance with a modified form of the invention, an etching solution for the partial removal of the mirror-coating solution may be introduced into the interior space of the glass tube in such a quantity that the interior space is only partially filled, and this etching solution may be removed from the interior space after a certain dwell time. If desired, a cylindrical shell may be introduced into the glass tube to screen off part of the glass tube that is not to be metal coated.

Yet another method for the coating of the glass tube in accordance with the invention includes the following steps:

the interior surface of the glass tube is wetted with a sensitizer solution;

optionally, any excess of the sensitizer solution is removed from the interior space of the tube;

a cylindrical shell is introduced into part of the interior surface of the glass tube to thereby screen off that part of the glass tube which is not to be metal-coated;

the interior of the glass tube is filled with a mirror-coating solution and the shell is removed;

optionally, any excess of the mirror-coating solution is removed from the interior space of the tube. In order to wet the interior surface of the glass tube with the sensitizer or mirror-coating solution, the interior space of the tube may be filled with sensitizer solution or mirror-coating solution.

What is claimed is:

1. A method for metal-coating a surface in the interior of a glass tube, with the metal-coated surface being a cylindrical shell, the method comprising the following steps:

the glass tube is sealed off at either end;

the glass tube is brought to a horizontal position;

a sensitizer solution is introduced into the interior of the horizontal glass tube in such a quantity that the interior of the glass tube is only partly filled, whereby the flow speed for the introduction of the sensitizer solution is chosen such that essentially no disturbing wave movements or splashes occur;

the sensitizer solution is kept at rest within the interior of the glass tube for a certain dwell period;

any excess of the sensitizer solution is removed from the interior of the glass tube after a certain dwell period;

a mirror-coating solution is then introduced into the interior of the glass tube, with substantially the entire interior surface of the glass tube being wetted by the mirror-coating solution; and any excess of the mirror-coating solution is removed from the interior of the glass tube.

2. A method as claimed in claim 1, wherein the glass tube is preheated.

3. A method as claimed in claim 1, wherein in order to intensify the wetting with minor-coating solution, the glass tube is made to rotate over a certain time span.

4. A method as claimed in claim 1, wherein the glass tube is rinsed after the removal of the sensitizer solution.

5. A method as claimed in claim 4, wherein the interior space of the glass tube is dried with hot air after the minor-coating and optionally also after the rinsing.

6. A method as claimed in claim 1, wherein the dwell time of the sensitizer solution in the interior of the glass tube is between one and sixty seconds.

7. A method as claimed in claim 1, wherein the dwell time of the sensitizer solution in the interior of the glass tube is between ten and thirty seconds.

8. A method as claimed in claim 1, wherein the dwell time of the minor-coating solution in the interior of the glass tube is between one and ten minutes.

9. A method as claimed in claim 1, wherein the dwell time of the minor-coating solution in the interior of the glass tube is between two and five minutes.

10. A method as claimed in claim 1, wherein the cylindrical shell to be minor-coated is a cylindrical half shell.

11. A method for metal-coating a surface in the interior of a glass tube, with the metal-coated surface being a cylindrical shell, the method comprising the following steps:

the interior surface of the glass tube is wetted with a sensitizer solution;

any excess of the sensitizer solution is removed from the interior of the glass tube;

the interior surface of the glass tube is wetted with a mirror-coating solution;

any excess of the mirror-coating solution is removed from the interior of the glass tube;

the glass tube is brought to the horizontal position;

both ends of the glass tube are closed off;

an etching solution for the partial removal of the mirror-coating is introduced into the interior space of the horizontal glass tube in such a quantity that the interior space is filled only partly, whereby the flow speed for the introduction of the etching solution is chosen such that essentially no disturbing wave movements or splashes occur and the etching solution is kept at rest within the interior of the glass tube for a certain dwell period; and the etching solution is removed from the interior of the glass tube after the dwell time.

12. A method as claimed in claim 11, wherein the wetting of the interior surface of the glass tube with sensitizer solution and/or the wetting of the interior surface with mirror-coating solution is produced in such a way that the interior of the glass tube is substantially filled with a sensitizer solution or with a mirror-coating solution.

13. A method as claimed in claim 12, wherein the glass tube is preheated before being wetted with the sensitizer solution.

14. A method as claimed in claim 11, wherein the glass tube is preheated before being wetted with the sensitizer solution.

15. A method as claimed in claim 11, wherein in order to intensify the wetting with sensitizer solution or mirror-coating solution or etching solution, the glass tube is made to rotate over a certain time span.

16. A method for metal-coating a surface in the interior of a glass tube, with the metal-coating surface being a cylindrical shell, the method comprising:

the interior surface of the glass tube is wetted with a sensitizer solution and, optionally, any excess of sensitizer solution is removed from the interior of the glass tube;

a cylindrical shell being a unitary member is introduced into the interior of the glass tube to thereby screen a part of the glass tube interior surface which is not to be metal-coated;

then the interior of the glass tube is filled with a mirror-coating solution;

any excess of mirror-coating solution is removed from the interior of the glass tube and;

the cylindrical shell is removed from the interior of the glass tube.

17. A method as claimed in claim 16, wherein for wetting the interior surface of the glass tube with the sensitizer or mirror-coating solution the interior of the glass tube is filled with the sensitizer solution or with mirror-coating solution.

18. A method as claimed in claim 17, wherein the glass tube is preheated before being wetted with the sensitizer solution.

19. A method as claimed in claim 16, wherein the glass tube is preheated before being wetted with the sensitizer solution.

* * * * *

UNITED STATES PATENT AND TRADEMARK OFFICE
CERTIFICATE OF CORRECTION

PATENT NO. : 6,902,761 B2
DATED : June 7, 2005
INVENTOR(S) : Stephan Tratzky et al.

It is certified that error appears in the above-identified patent and that said Letters Patent is hereby corrected as shown below:

<u>Title page,</u>
Item [57], ABSTRACT, please replace with the following:
-- The selective coating method for a glass tube with a cylindrical shell comprises the following process steps: the glass tube is sealed off at either end; the glass tube is brought to a horizontal position; a sensitizer solution is introduced into the interior space of the glass tube in such a quantity that the interior space is only partly filled; the sensitizer solution is removed from the interior space after a certain dwell period; a mirror-coating solution is introduced into the interior space of the glass tube, with the entire interior surface of the glass tube being wetted by the mirror-coating solution; and the used-up mirror-coating solution is removed from the interior space of the glass tube. --.

Signed and Sealed this

Thirtieth Day of August, 2005

JON W. DUDAS
*Director of the United States Patent and Trademark Office*